US012513217B2

United States Patent
Karapantelakis et al.

(10) Patent No.: US 12,513,217 B2
(45) Date of Patent: Dec. 30, 2025

(54) METHOD FOR NOTIFICATION OF NETWORK FUNCTION PRODUCER (NFp) QUALITY

(71) Applicant: Telefonaktiebolaget LM Ericsson (publ), Stockholm (SE)

(72) Inventors: Athanasios Karapantelakis, Solna (SE); Ioannis Fikouras, Stockholm (SE); Peter Woerndle, Wangen im Allgäu (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/269,019

(22) PCT Filed: Feb. 3, 2021

(86) PCT No.: PCT/IB2021/050880
§ 371 (c)(1),
(2) Date: Jun. 22, 2023

(87) PCT Pub. No.: WO2022/167836
PCT Pub. Date: Aug. 11, 2022

(65) Prior Publication Data
US 2024/0064211 A1 Feb. 22, 2024

(51) Int. Cl.
*H04L 67/51* (2022.01)
*H04L 41/5009* (2022.01)

(52) U.S. Cl.
CPC .......... *H04L 67/51* (2022.05); *H04L 41/5009* (2013.01)

(58) Field of Classification Search
CPC ............................. H04L 67/51; H04L 41/5009
See application file for complete search history.

(56) References Cited

U.S. PATENT DOCUMENTS 11,323,327 B1 * 5/2022 Chitalia ................ H04L 63/102
2019/0191480 A1 * 6/2019 Dowlatkhah ......... H04L 47/787
(Continued)

FOREIGN PATENT DOCUMENTS

CN 110121194 A 8/2019
WO 2020108507 A1 6/2020

OTHER PUBLICATIONS

ETSI, "5G; 5G System; Network function repository services; Stage 3 (3GPP TS 29.510 version 15.1.0 Release 15)", Technical Specification, ETSI TS 129 510 V15.1.0, Oct. 2018, pp. 1-87, ETSI.
(Continued)

*Primary Examiner* — Chris Parry
*Assistant Examiner* — Steven C Nguyen
(74) *Attorney, Agent, or Firm* — COATS & BENNETT, PLLC

(57) ABSTRACT

This disclosure provides new parameters for discovery request messages and discovery response messages communicated between a Network Function (NF) consumer (an NFc) (100) and a Network Repository Function (NRF) (130) in a core network. The new parameters support the discovery and selection of one or more NF services to be consumed by the NFc. More particularly, when the NFc initiates a discovery request, it identifies a particular NF service type to consume to the NRF. Included in the discovery request message are the new parameters specifying a particular set of one or more quality metrics the NRF is to report to the NFc in the discovery response message. The quality metrics include the most current measurement values for the specified NF service, but may also include historical measurement values spanning a time duration that is specified by the NFc in the discovery request message.

13 Claims, 10 Drawing Sheets

(56) References Cited

U.S. PATENT DOCUMENTS

| | | | |
|---|---|---|---|
| 2020/0137174 A1* | 4/2020 | Stammers | H04L 67/51 |
| 2021/0014680 A1* | 1/2021 | Saarinen | H04L 63/12 |
| 2021/0234934 A1* | 7/2021 | Xia | H04L 67/51 |
| 2022/0070648 A1* | 3/2022 | Krishan | H04W 8/005 |
| 2022/0174471 A1* | 6/2022 | Farooq | H04W 8/005 |
| 2023/0269608 A1* | 8/2023 | Puente Pestaña | H04W 24/10 370/252 |

OTHER PUBLICATIONS

3rd Generation Partnership Project, "3rd Generation Partnership Project; Technical Specification Group Services and System Aspects; Study on enablers for network automation for the 5G System (5GS); Phase 2 (Release 17)", Technical Report, 3GPP TR 23.700-91 V17.0.0, Dec. 2020, pp. 1-382, 3GPP.

* cited by examiner

METHOD FOR NOTIFICATION OF NETWORK FUNCTION PRODUCER (NFp) QUALITY

TECHNICAL FIELD

The present disclosure relates generally to communications networks, and more particularly to discovering Network Function (NF) services based on selected criteria.

BACKGROUND 5G core networks introduce a service-based architecture in which a core network is broken down into communicating services known as Network Function (NF) services. As is known in the art, many such services comprise Network Functions and are "consumed" by other NFs, known as NF consumers (NFc). One NF in particular is known as a Network Repository Function (NRF). Conventionally, the NRF provides NF discovery and selection services for NF services. Thus, using a request-response mechanism, any NFc can communicate with the NRF to discover and select services offered by other NFs. Upon receiving a response from the NRF, the requesting NFc can select an NF providing a desired NF service and access that NF directly without having to communicate with the NF via other nodes.

Conventionally, the NRF responds to requests sent by an NFc with a list of candidate NF producers (NFps) that produce the requested NF service. The list of candidate NFps are provided in the form of NF service instances (i.e., nfInstances) and are selected by the NRF based on a set of criteria provided by the NFc. The criteria includes, for example, quality metrics such as latency, availability, power consumption, etc. of each nfInstance. Those NFps that match the provided criteria are then placed into an NFProfile and sent to the requesting NFc embedded in the response. The quality metrics associated with each candidate NFp are abstracted and included in the priority and capacity parameters of the NFProfile as integers ranging from 0 to 65535.

SUMMARY

Embodiments of the present disclosure provide new parameters for discovery requests and discovery responses communicated between an NFc and an NRF to support the discovery and selection of one or more NF services to be consumed by the NFc. More particularly, the NFc initiates a discovery request by sending a discovery request message for a particular NF service type to the NRF. The discovery request message specifies a particular set of one or more quality metrics the NRF is to use when identifying the NFps that provide instances of the NF service type. Additionally, in some embodiments, the NFc also specifies whether the NRF should provide historical values for the quality metrics. Based on the specified quality metrics, the NRF then determines a list of candidate NFps that produce the requested NF service type and provides that list to the NFc in a discovery response message. The NRF will also provide the historical values of the specified quality metrics when requested by the NFc.

Accordingly, in one embodiment, the present disclosure provides a method for discovering Network Function (NF) services. The method is implemented by an NF consumer (NFc) and comprises the NFc determining an NF service type to consume, generating a discovery request message to discover instances of the NF service type produced by one or more candidate NF producers (NFps), wherein the discovery request message specifies one or more selected operational metrics of the NF service type to be reported to the NFc, and sending the discovery request message to a Network Repository Function (NRF) to discover the one or more candidate NFps.

Additionally, in one embodiment, the present disclosure also provides a method for discovering Network Function (NF) services implemented by an Network Repository Function (NRF). In this embodiment, the method comprises receiving, from an NF consumer (NFc), a discovery request message comprising information specifying one or more criteria for determining instances of an NF service type to be consumed by the NFc, and one or more operational metrics for the instances of the NF service type. Additionally, the method also comprises determining one or more instances of the NF service type based on the one or more criteria, obtaining measurement data for the one or more instances based on the one or more operational metrics of the NF service type, generating a discovery response message to include a list of the one or more instances of the NF service type and the measurement data, and sending the discovery response message to the NFc.

The present disclosure also provides a network node configured as a Network Function consumer (NFc). In one embodiment, the node comprises communications interface circuitry operatively coupled to processing circuitry. The communications interface circuitry is configured to communicate with a Network Repository Function (NRF) to discover Network Function (NF) services produced by one or more NF producers (NFps). The processing circuitry is configured to determine an NF service type to consume, generate a discovery request message to discover instances of the NF service type produced by one or more candidate NFps, wherein the discovery request message specifies one or more selected operational metrics of the NF service type to be reported to the NFc, and send the discovery request message to the NRF to discover the one or more candidate NFps.

The present disclosure also provides a non-transitory computer-readable medium comprising a computer program stored thereon. The computer program comprises instructions that, when executed by processing circuitry in a node configured as a Network Function consumer (NFc), causes the node to determine a Network Function (NF) service type to consume, generate a discovery request message to discover instances of the NF service type produced by one or more candidate NF producers (NFps), wherein the discovery request message specifies one or more selected operational metrics of the NF service type to be reported to the NFc, and send the discovery request message to a Network Repository Function (NRF) to discover the one or more candidate NFps.

The present disclosure also provides a network node configured as a Network Repository Function (NRF). In one embodiment, the node comprises communications interface circuitry configured to communicate with a Network Function consumer (NFc) and one or more Network Function producers (NFps) to discover Network Function (NF) services produced by the one or more NFps. The node also comprises processing circuitry, operatively connected to the communications interface circuitry, that is configured to receive, from an NFc, a discovery request message comprising information specifying one or more criteria for determining instances of an NF service type to be consumed by the NFc, and one or more operational metrics for the instances of the NF service type, determine one or more instances of the NF service type based on the one or more criteria, obtain measurement data for the one or more instances based on the one or more operational metrics of the NF service type, and send the discovery response message to the NFc, the discovery response message comprising a list of the one or more instances of the NF service type, and the measurement data for the one or more instances.

Additionally, the present disclosure provides a non-transitory computer-readable medium comprising a computer program stored thereon. In one embodiment, the computer program comprising instructions that, when executed by processing circuitry in a node configured as a Network Repository Function (NRF), causes the node to receive, from an NFc, a discovery request message comprising information specifying one or more criteria for determining instances of an NF service type to be consumed by the NFc, and one or more operational metrics for the instances of the NF service type, determine one or more instances of the NF service type based on the one or more criteria, obtain measurement data for the one or more instances based on the one or more operational metrics of the NF service type, and send the discovery response message to the NFc, the discovery response message comprising a list of the one or more instances of the NF service type, and the measurement data for the one or more instances.

DETAILED DESCRIPTION

Embodiments of the present disclosure provide new parameters to be included in discovery request and discovery response messages communicated between a Network Function consumer (NFc) that consumes NF services and a Network Repository Function (NRF) that supports the discovery and selection of the NF services to be consumed by the NFc. According to the present disclosure, the NFc may be any node that is in, or communicatively connected to, a 5G core network. However, in one embodiment, the NFc is a Policy and Charging Control node.

Figure 1:
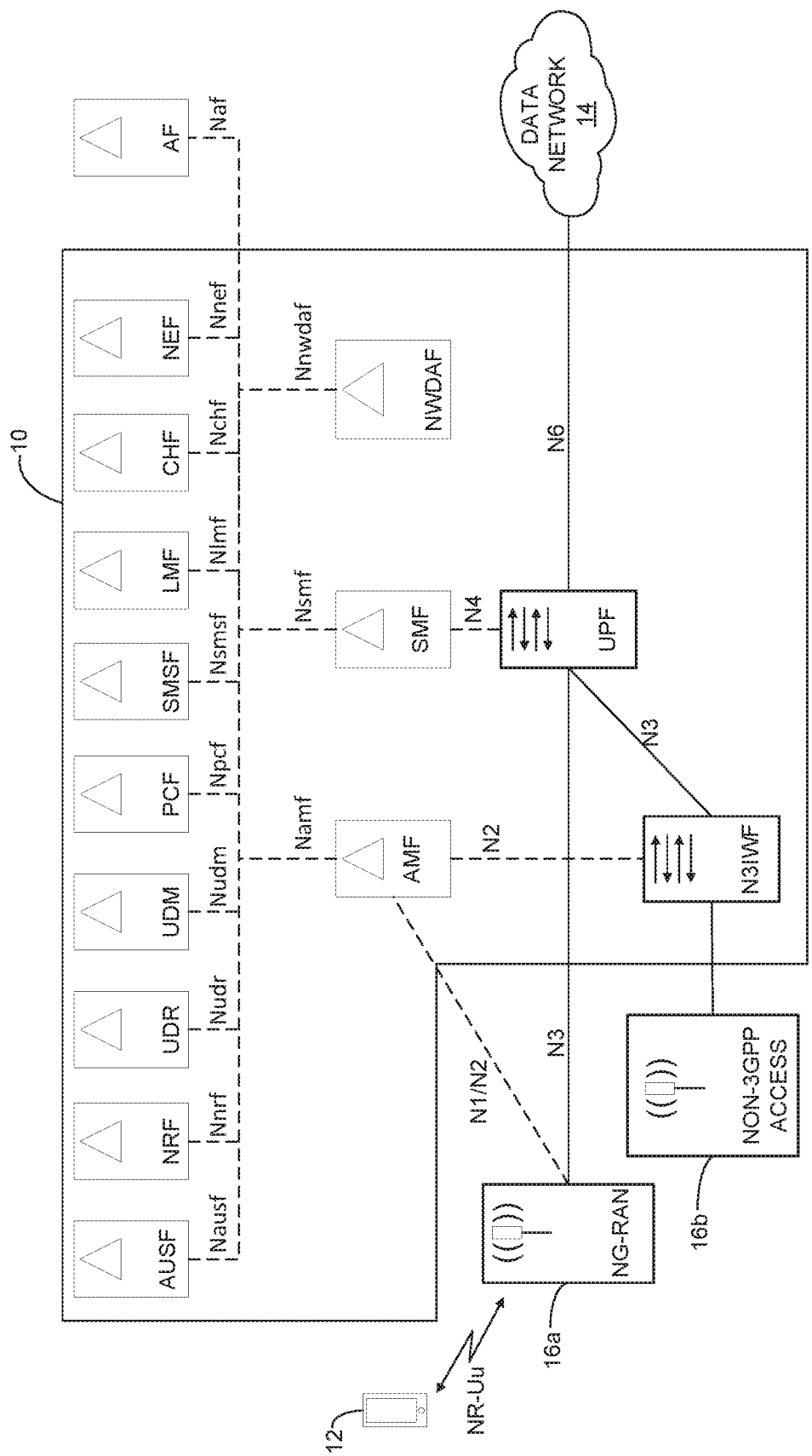
FIG. 1 is a functional block diagram illustrating a 5G Core Network (CN) as a mesh of interconnected services according to one embodiment of the present disclosure.

As previously stated, 5G core networks introduce a service-based architecture that functionally separates a core network into communicating services known as Network Function (NF) services. Once such core network (CN) 10 is cloud-based and illustrated in FIG. 1. As seen in this figure, core network 10 communicatively interconnects end user devices, such as User Equipment (UE) 12, with a data network 14. The data network 14 may comprise, for example, any private and/or public IP network (e.g., the Internet) capable of communicating data in packets. Access to CN 10 may be accomplished via communications with an Access and Mobility management Function (AMF) via an N1 interface, or via a Radio Access Network (RAN) via a NR-Uu air interface. As seen in FIG. 1, the RAN may be one or both of a Next Generation Radio Access Network (NG-RAN) or a non-3GPP Access Network.

There are two different types of traffic for a UE such as UE 12. The first type of traffic is control-plane (CP) signaling. Such CP signaling includes connection signaling, session signaling, and mobility control signaling, for example, and is communicated with an AMF in CN 10 via a N1/N2 interface, and then between the other NFs in CN 10 (e.g. AUSF, NRF, UDR, etc, . . . ) as indicated by the "dashed" connections. The second type of traffic for UE 12 is user-plane (UP) signaling. Such UP signaling includes user traffic and is communicated with data network 14 via one or more gateways.

Regardless of access type, however, CN 10 comprises a plurality of NFs configured as a mesh of interconnected services. As illustrated in FIG. 1, the core network 10 may comprise the following NFs:
Access & Mobility management Function (AMF);
Application Function (AF);
Authentication Server Function (AUSF);
Charging Handling Function (CHF);
Location Management Function (LMF);
Network Data Analytics Function (NDAF);
Network Exposure Function (NEF);
Network Repository Function (NRF);
Policy Control Function (PCF);
Session Management Function (SMF);
SMS Function (SMSF);
Unified Data Repository (UDR);
Unified Data Management (UDM);
User Plane Function (UPF);
Non-3GPP Interworking Function (N3IWF).

It should be noted here that not all the NFs listed above are mandatory. Rather, some are optional. For example, the NEF, which provides oversight of UE performance to third parties, and the NDAF, which is utilized for network analytics and machine learning services, are optional.

Regardless of whether the nodes are mandatory or optional, however, the conventional functionality of these NFs is well-known to those of ordinary skill in the art. Thus, their respective conventional functions are not discussed in detail here. However, as described in more detail below, each of these NFs may be configured to function as a NFc that consumes NF services, and/or a NFp that produces NF services, according to the present embodiments.

Figure 2:
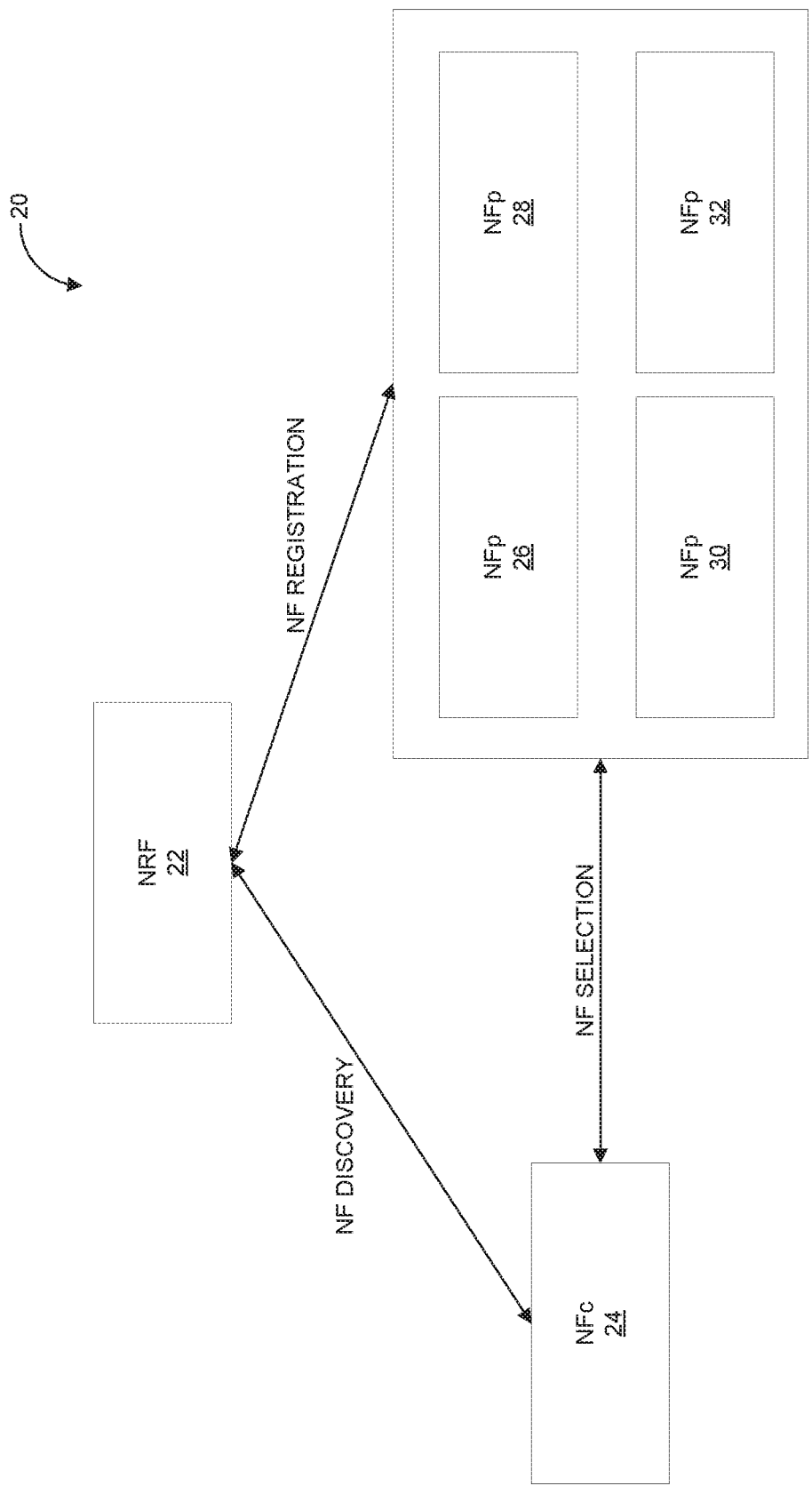
FIG. 2 is a functional block diagram illustrating Network Function (NF) registration, discovery, and selection according to one embodiment of the present disclosure.
Figure 3:
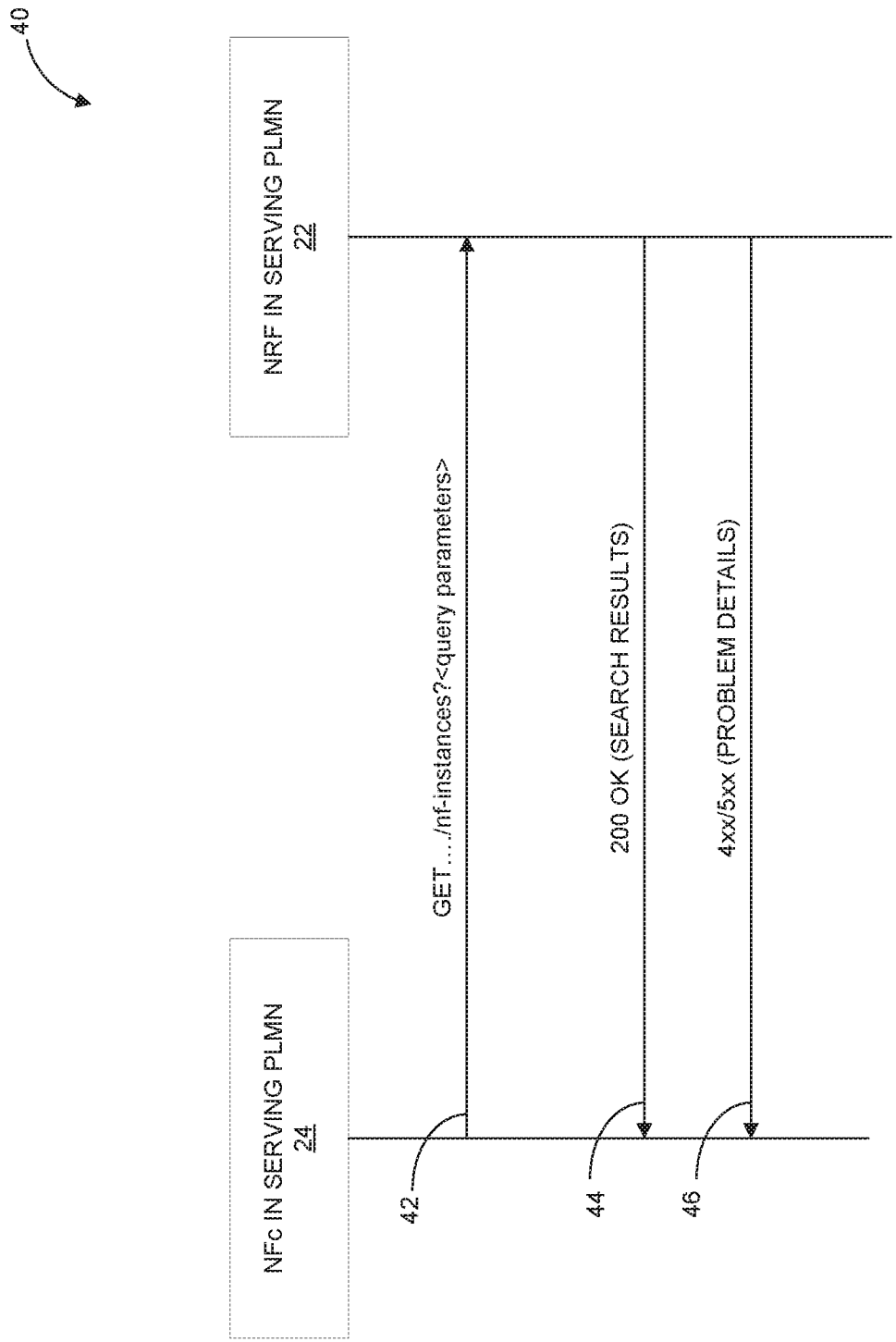
FIG. 3 is a signaling diagram illustrating a request-response message exchange between an NF consumer (NFc) and the NRF.

In the context of the present embodiments, one NF of interest is the NRF 22. As seen in system 20 of FIG. 2, and in signaling diagram 40 of FIG. 3, the NRF 22 facilitates the discovery and selection of NF services for the NFcs 24. Particularly, NFps 26, 28, 30, 32 register their services with the NRF 22. Then, using a request-response mechanism, which is described in more detail later, any one of the NFcs 24 (e.g., a Policy and Charging Control node) can initiate a discovery request by sending a GET message to NRF 22 to discover and select services offered by other NFs (FIG. 3—line 42). In this embodiment, the discovery request message comprises a list of parameters that include the type or instance name of NF to discover, as well as network slice related identifiers (e.g. NSSI) and service parameters (e.g. list of features to be supported). The NRF 22 then responds to NFc 24 by sending a discovery response message that includes a list of embedded NFprofiles—each of which corresponds to, and contains information about, the NFp (FIG. 3—line 44). The NRF 22 also indicates any problems in fulfilling the discovery request to NFc 24 using conventional messages (FIG. 3—line 46).

Table 1 below illustrates come information that may be included in a typical discovery request message sent by NRF 22. In this table, the column heading 'P' stands for "presence." The values in this column can be of the following:
M (Mandatory): an attribute marked with 'M' shall always be included;
O (Optional): an attribute marked with 'O' may or may not be included; and
C (Conditional): an attribute marked with 'C' is included only if a condition is satisfied.

However, conventional systems some drawbacks. Particularly, in many cases, an NFc 24 may not be interested in every NFp quality metric. For example, availability metrics for an NFp 26 may be more important to the NFc 24 than some other metric, such as power consumption of the NFp 26. Therefore, in practice, different NFcs 24 may be interested in different quality metrics depending on the type of nfInstance they want to consume. Yet, with conventional systems, the quality metrics used by NFP 22 to determine the candidate NFps 26, 28, 30, 32 are not selectable by the NFc.

Further, conventional systems only provide the latest known current values for the quality metrics. In some cases, however, an NFc 24 may also be interested in the historical values of those quality metrics. Such historical values would allow the NFc 24 to perform an analysis and identify patterns of variation in each quality metric. Using a machine learning algorithm, the results of the analysis could then be utilized to predict a future "quality" of one or more of the reported NF service instances (i.e., the nfInstances). Conventional systems do not provide the historical values for selected quality metrics.

To address this, embodiments of the present disclosure extend the discovery request messages and the discovery result messages to support NFc-control over the specific quality metrics to be reported by NRF 22, as well as the historical values of those selected metrics, when initiating a discovery request towards NRF 22.

Figure 4:
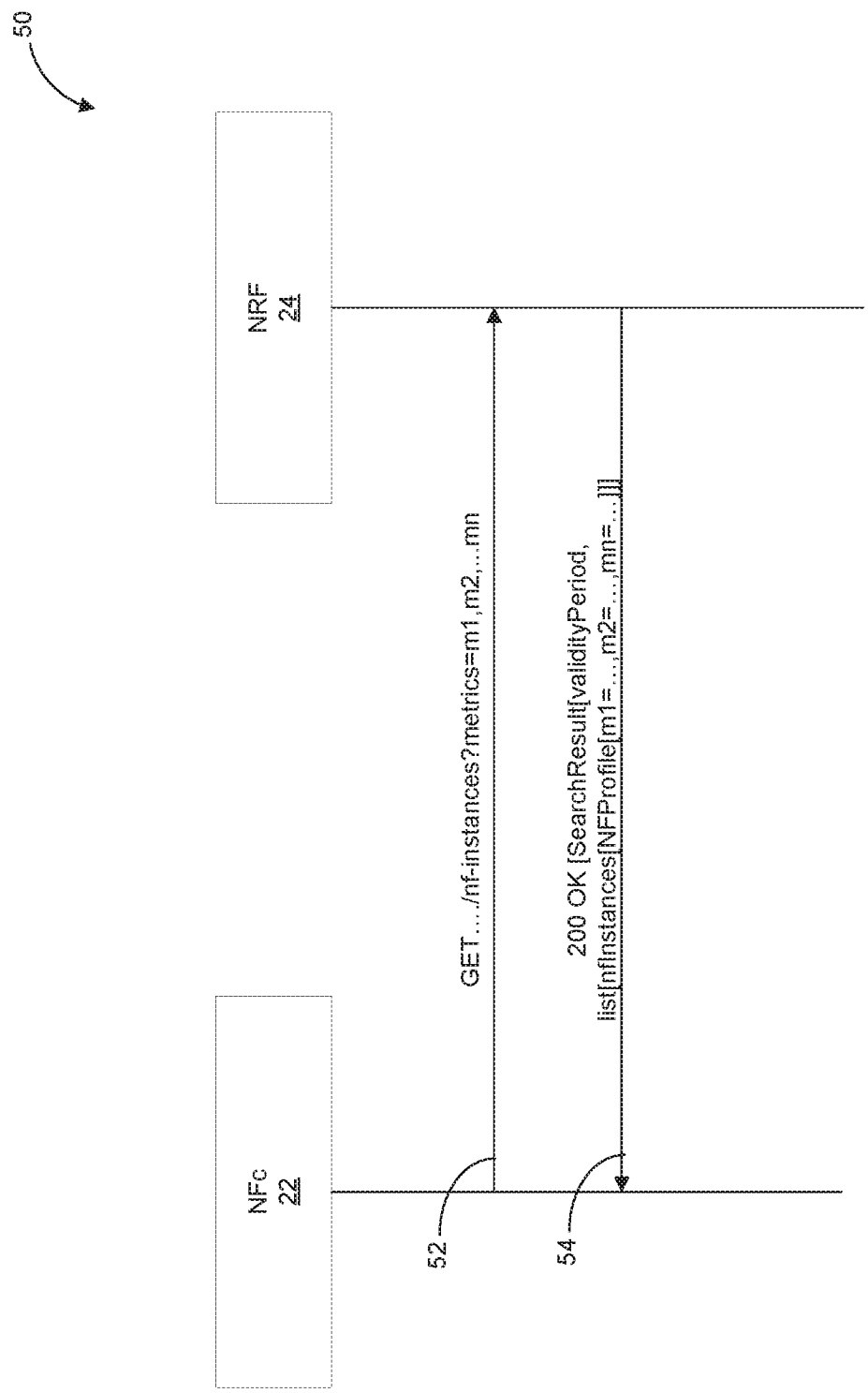
FIG. 4 is a signaling diagram illustrating a request-response exchange between the NFc and the NRF in which the NFc specifies the metrics the NRF should use to discover requested NF services according to one embodiment of the present disclosure.

FIG. 4 is a signaling diagram 50 illustrating the exchange of the discovery request messages and the discovery

TABLE 1

| Payload of a discovery response message | | | | |
| --- | --- | --- | --- | --- |
| Attribute Name | Data Type | P | Cardinality | Description |
| validityPeriod | integer | M | 1 | This attribute contains the time in seconds during which the discovery result is considered valid and can be cached by the NFc. This value shall be the same value as the value contained in the "max-age" parameter of the "Cache Control" header field sent in the discovery response message. |
| nfInstances | Array(NFProfile) | M | 0 . . . N | NF service instances. If present, this attribute shall contain an array of NF instance profiles, matching the search criteria indicated by the query parameters of the discovery request. |

The list of candidate NFps 26, 28, 30, 32 are selected by the NRF 22 based on a set of criteria provided by the NFc 24. Such criteria includes, for example, quality metrics such as latency, availability, power consumption, etc., of each instance of the requested NF service. Upon determining which of the NFps 26, 28, 30, 32 match the provided criteria, NRF 22 identifies these candidate NFps 26, 28, 30, 32 to the NFc 24 to NFc 24 in a discovery response message. To accomplish this, NRF 22 populates respective NFProfiles with information about the candidate NFps 26, 28, 30, 32. Such information includes, but is not limited to, the quality metrics associated with each candidate NFp 26, 28, 30, 32, which are abstracted and included in the priority and capacity parameters of the NFProfile as integers ranging from 0 to 65535. The NFProfiles are then embedded into the discovery request message and sent to the requesting NFc 24.

response messages between the NFc 24 and NRF 22 according to one embodiment of the present disclosure. As seen in FIG. 4, NFc 24 initiates a discovery process by sending NRF 22 a discovery request message (line 52). In this embodiment, the discovery request message is an HTTP GET message and includes a list of nfInstances (i.e., instances of one or more NF services the NFc 24 would like to consume) and one or more quality metric values m1 . . . mx. According to the present embodiments, the quality metric values m1 . . . mx are new parameters and are specially selected by the NFc 24 based on those the NFc 24 is interested in. Further, the quality metric values m1 . . . mx pertain to each nfInstance. Table 2 below describes the new quality metric parameter.

TABLE 2

New parameter definition for discovery request message.

| Name | Data Type | P | Cardinality | Description |
|---|---|---|---|---|
| metric | array(string) | O | 0 . . . 1 | An array of desired metrics mn to be reported by the NRF to the NFc. |

As seen in Table 2, the new parameter is optional, and because it is of an array data type, can have more than one metric. Further, each metric in the array can be the same or different from the other metrics in the array, and be one of the following values.

Parameter Name: This indicates the simple reporting of the parameter or parameters by name, e.g. "load," "availability," "latency," and "power consumption." This parameter causes the NRF 22 to report the latest available measurements (i.e., the most current measurements available) for the particular metric.

Historical Reporting: This indicates that the NRF 22 should also report the historical measurement values for the identified parameters. This parameter is constrained by a time duration (i.e., a timespan defined as the time between when the discovery request message is sent and a specified past time). Optionally, the following may be specified with respect to the Historical Reporting:

Sampling rate and central tendency measure: This parameter defines a number of samples that should be provided, and the measure of central tendency to be applied to every sample (e.g., arithmetic mean, median, mode, geometric mean, etc.). The reason for specifying a central tendency is because each sample will represent of a number of values collected by the NRF (e.g., via a heartbeat message function).

Statistical Measures of Distribution: This parameter may be further specified in situations where the NFc 24 requires a more detailed understanding about the distribution of values per sample. Measures of statistical dispersion such as variance, standard deviation, mean absolute difference, and interquartile range may be specified.

Table 3 below illustrates some example discovery request messages formatted according to embodiments of the present disclosure.

TABLE 3

Example discovery request messages

| Example Number | NFC Metric Parameter Value | Description |
|---|---|---|
| 1 | metrics = availability, latency | Indicates to the NRF to get the latest (i.e., most current) value of availability and latency for every nfinstance matching discovery request criteria |
| 2 | metrics = availability[time = 1602504732, samples = 1, tendency = mean], latency | Indicates to the NRF to get the latest (i.e., most current) value of latency and the average of availability from Oct. 12, 2020, 12:12pm (UTC) until the time the discovery request message was sent for every nfinstance matching discovery request criteria. The time the message was sent in this embodiment is 1602504732 and specified in Unix time format. |
| 3 | metrics = availability, latency[time = 1601899932, samples = 10, tendency = mean, distr_measure = stdev] | Indicates to the NRF to get the latest (i.e., most current) value for availability and 10 equally timespaced samples of latency from Oct. 5, 2020, 12:12pm (UTC) until the time the discovery request message was sent. For each of the samples, the average value is calculated at the NRF from all datapoints within a sample's timeslot. For all these datapoints, a standard deviation is also calculated. |

Returning to FIG. 4, the NRF 22, upon receipt of the discovery request message, determines which nfInstances match the criteria included in the message and return a list of candidate NFps 26, 28, 30, 32 in the discovery response message (line 54). As stated above, the present embodiments introduce a new parameter "metricValues" to be included with NFProfile. This new parameter reports the values of the metrics requested by NFc 24 in the discovery request message. In situations where the NFc 24 specifies the load parameter as the metric to be reported, embodiments of the present disclosure modify the existing load parameter of NFProfile to support the reporting of historical load measurement values as well as the currently available dynamic load. Table 4 below defines the structure of a discovery response message sent by NRF 22 formatted according to one embodiment of the present disclosure.

TABLE 4

New parameter definition for discovery response message

| Name | Data type | P | Cardinality | Description |
|---|---|---|---|---|
| metricValues | array(string) | O | 0 . . . N | This parameter is an array that contains the values for the metrics requested by the NFc for each specified nfInstance. |
| load | Integer -> array(string) | O | 0 . . . 1 | This parameter includes the current and/or historical measurement values for the load of an nfInstance as requested by NFc. |

As seen in Table 4, the notation used in the discovery request message is similar to that used when describing the discovery request message. For example, consider a situation where the discovery request message sent by NFc 24 was example message 2 seen in Table 3.

metrics=availability[time=1602504732,samples=1,
 tendency=mean],latency

In this example, the discovery response message returned by NRF 22 could include relative values and would be:

metricvalues=[0.95,13].

This indicates that an average (i.e., arithmetic mean) of availability requested from 10/12/2020, 12:12 pm (UTC) is 95%, whereas the latest latency measurement is 13 ms.

Similarly, consider a situation where the discovery request message sent by NFc 24 was example 3 seen in Table 3. The discovery request message would be:

metrics=availability,latency[time=1601899932,
 samples=10, tendency=mean,
 distr_measure=stdev].

The discovery response message returned by the NRF 22 in this example, which may include relative values, might then be:

metricvalues=[0.99,[23,1.43],[12,1.91],[14,2.73],[15,
 3.25],[21,2.94],[32,6.21],[11,4.31],[19,3.12],[22,
 0.84],[24,2.77]].

This values in this message indicate that latest (i.e., most current) measurement of availability is 99%. Additionally, the discovery response message includes 10 equally spaced measurements of [latency, standard deviation] tuples (i.e., historical values) between 10/05/2020, 12:12 pm (UTC) and the time that the discovery request message was sent to the NRF 22.

It should be noted here that the discovery response messages seen above are examples only. The discovery response messages may include explicit values, relative values, or a combination of explicit and relative values. Further, the NRF 22 has discretion on whether to respond with exactly the values that NFc 24 requested or send a subset of those values. For example, consider a situation where NFc 24 requests 1000 samples. If NRF 22 deems that the number of requested samples is too many to fit in one protocol data unit (PDU), NRF 22 may elect to respond with 10 samples. This decision may, for example, be based on a predetermined, internally configured maximum value.

The embodiments described herein provide benefits that conventional solutions do not provide. For example, where conventional systems provide only a generic reporting of values to NFc 24, the present embodiments allow for the NFc to perform a more meaningful nfInstance selection process by allowing for a more fine-grained reporting of the quality metrics that are of value to that particular NFc 24. In addition, the reporting of historical quality metric values allows NFc to make more informed decisions given a predicted future quality of an nfInstance.

Figure 5:
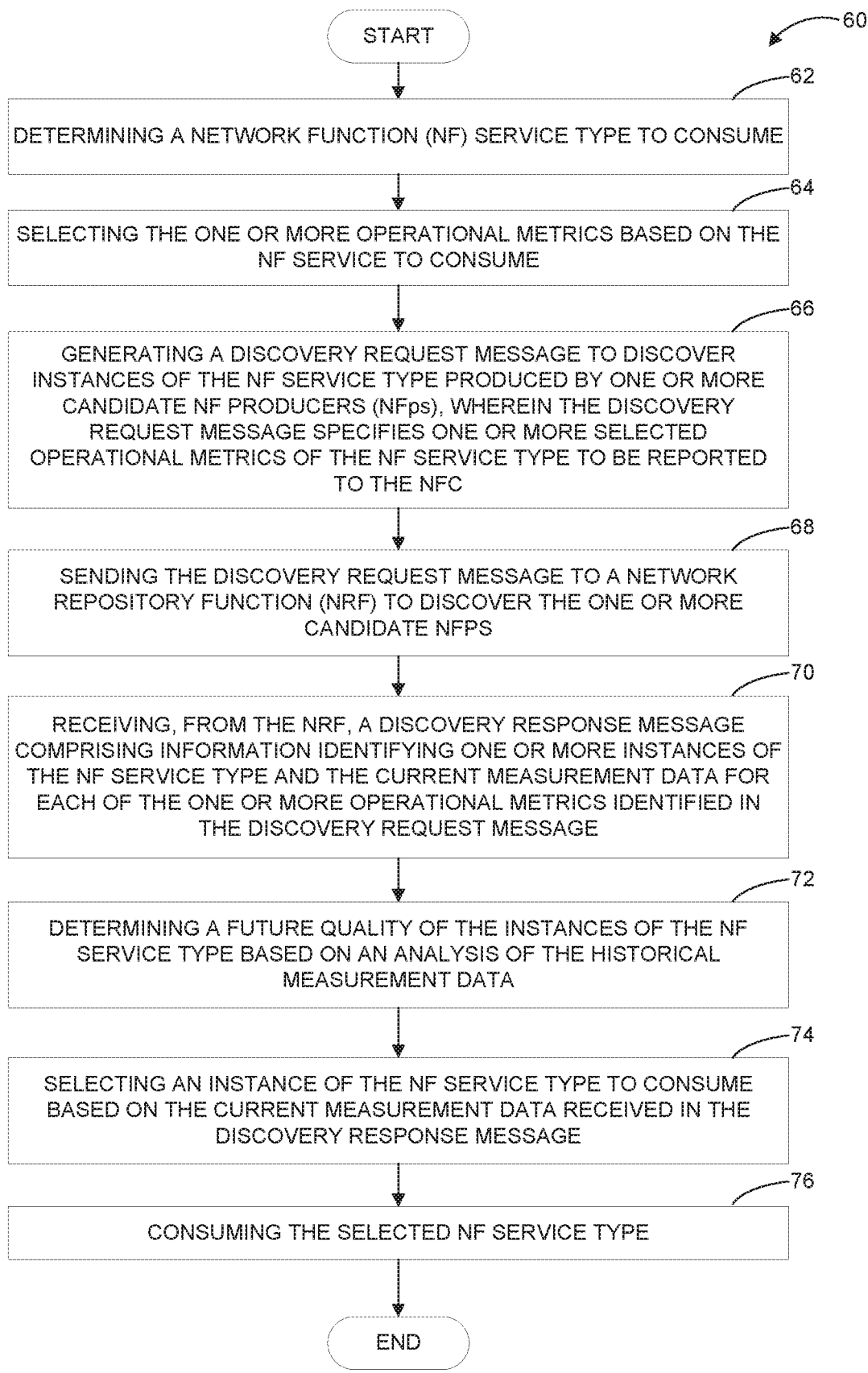
FIG. 5 is a flow diagram illustrating a method, implemented at an NFc, for discovering NF services according to one embodiment of the present disclosure.

FIG. 5 is a flow diagram illustrating a method 60 for discovering NF services according to one embodiment of the present disclosure. The method 60 is implemented by NFc 24.

As seen in FIG. 5, NFc 24 first determines an NF service type to consume (box 62). Once determined, NFc 24 selects the particular one or more operational metrics (i.e., the aforementioned quality metrics) based on the determined NF service type (box 64). NFc 24 then generates a discovery request message (e.g., an HTTP GET message) to discover instances of the NF service type produced by one or more candidate NFps. As previously described, the discovery request message is generated to specify the one or more selected operational metrics of the NF service type to be reported by NRF 22 to NFc 24 (box 66). NFc 24 then sends the discovery request message to the NRF 22 to discover the one or more candidate NFps (box 68).

In response to the discovery request message, NFc 24 receives, from the NRF, a discovery response message comprising information identifying one or more instances of the NF service type and the current measurement data for each of the one or more operational metrics identified in the discovery request message (box 70). Based on the information, and the historical measurement values, NFc 24 determines a future quality of the instances of the NF service type based on an analysis of the historical measurement data (box 72), and selects an instance of the NF service type to consume (box 74). So selected, NFc 24 consumes the selected NF service type (box 76).

In one embodiment, NFc 24 also selects the one or more operational metrics based on the NF service type to consume.

In one embodiment, the operational metrics comprise data associated with the execution of the NF type service.

In one embodiment, the operational metrics specify reporting current measurement data for one or more of a load, availability, latency, power consumption, jitter, throughput, packet loss, active sessions, and session drop rate, of the NF service type.

In one embodiment, the operational metrics further indicate a time span during which historical measurement data for an operational metric are to be reported.

In one embodiment, the time span comprises an elapsed time between a time that the request is sent to the NRF and a previous time specified by the operational metric.

In one embodiment, the operational metrics further specify a number of samples to be reported.

In one embodiment, the operational metrics further specify a tendency function to be applied to each sample to be reported. In such embodiments, the tendency function comprises at least one of an arithmetic mean, a median, a mode, and a geometric mean.

In one embodiment, the operational metrics further specify a statistical function to be applied to each sample to be reported. In such embodiments, the statistical function indicates a distribution of the samples to be reported and comprises at least one of a variance function, a standard deviation function, a mean absolute difference function, and an interquartile range function.

In one embodiment, the discovery response message further comprises historical measurement data for the selected instance of the NF service.

In one embodiment, NFc 24 also determines a future quality of the selected instance of the NF service type based on an analysis of the historical measurement data.

In one embodiment, the operational metrics comprise an array of one or more parameters sent to the NRF in the discovery request message.

Figure 6:
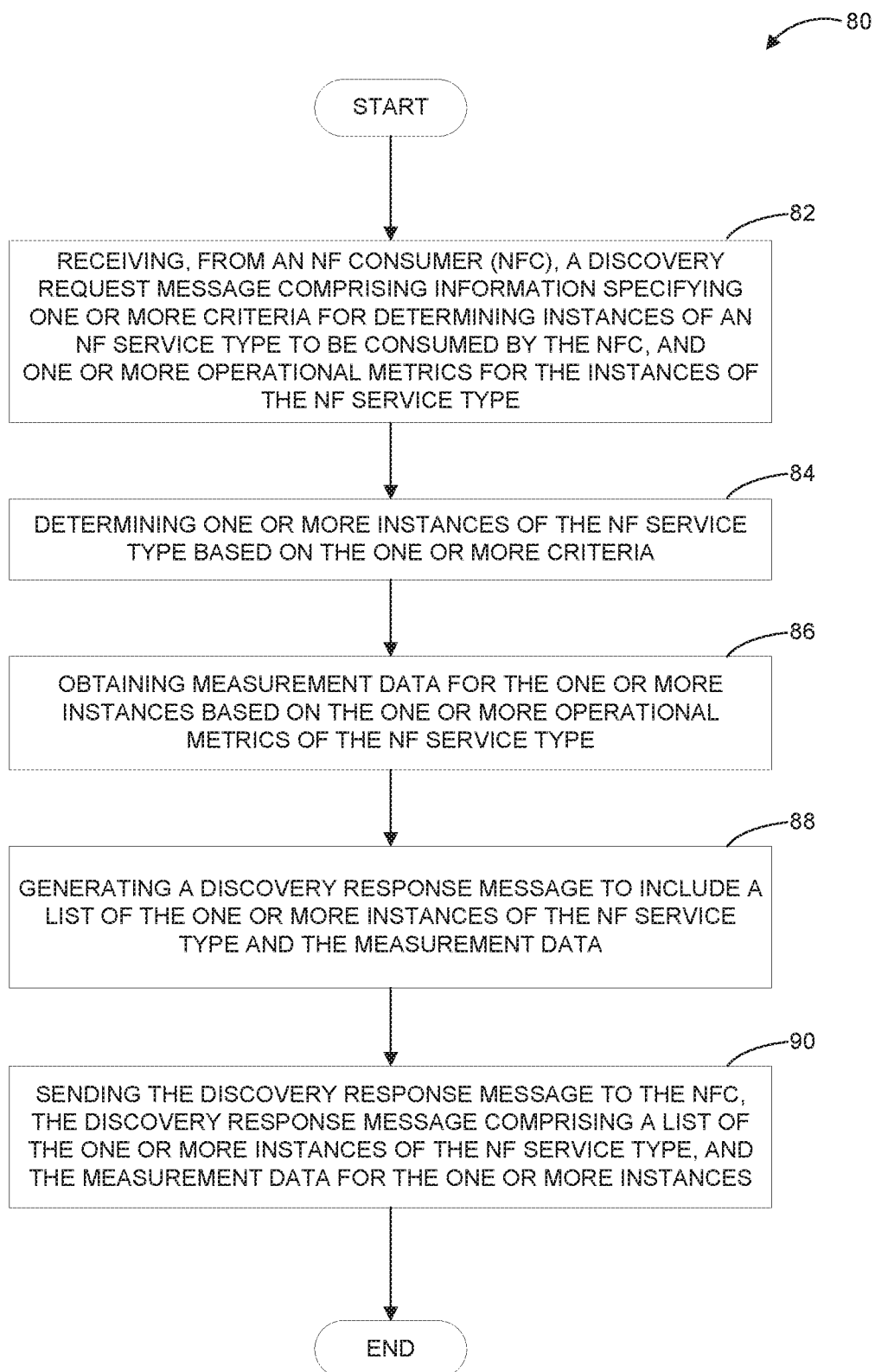
FIG. 6 is a flow diagram illustrating a method, implemented at an NRF, for discovering NF services according to one embodiment of the present disclosure.

FIG. 6 is a flow diagram illustrating a method 80 for discovering NF services according to one embodiment of the present disclosure. The method 80 is implemented by NRF 22.

As seen in FIG. 6, NRF 22 receives a discovery request message from the NFc 24. The discovery request message comprises information specifying one or more criteria for determining instances of an NF service type to be consumed by the NFc, and one or more operational metrics for the instances of the NF service type (box 82). NRF 22 then determines one or more instances of the NF service type based on the one or more criteria (box 84), and obtains measurement data for the one or more instances based on the one or more operational metrics of the NF service type (box 86). NRF 22 next generates a discovery response message to include a list of the one or more instances of the NF service type and the measurement data (box 88) and sends the discovery response message to the NFc (box 90). In this embodiment, the discovery request message comprises a list of the one or more instances of the NF service type, as well as the measurement data and, if required, the historical measurement data for the reported instances as requested by the NFc 24.

In one embodiment, the operational metrics comprise data associated with the execution of the NF service type.

In one embodiment, the measurement data for the one or more instances comprises current measurement data for one or more of a load, availability, latency, power consumption, jitter, throughput, packet loss, active sessions, and session drop rate, of the NF service type.

In one embodiment, the measurement data for the one or more instances further comprises historical measurement data for an operational metric are to be reported. Additionally, in one embodiment, the operational metrics further indicate a time span during which the historical measurement data for the operational metric is to be reported.

In one embodiment, the time span comprises an elapsed time between a time that the request was sent to the NRF by the NFc and a previous time specified by the operational metric.

In one embodiment, the operational metrics further specify a number of samples to be reported.

In one embodiment, the operational metrics further specify a tendency function to be applied to each sample to be reported. The tendency function comprises at least one of an arithmetic mean, a median, a mode, and a geometric mean.

In one embodiment, the operational metrics further specify a statistical function to be applied to each sample to be reported. The statistical function indicates a distribution of the samples to be reported and comprises at least one of a variance function, a standard deviation function, a mean absolute difference function, and an interquartile range function.

In one embodiment, the discovery response message comprises an NFProfile parameter that includes the measurement data for the one or more instances.

In one embodiment, the NFProfile parameter further comprises the historical measurement data.

Those of ordinary skill in the art should readily appreciate that the present disclosure is not limited to configuring NFc 24 to specify to NRF 22 to report only the current and historical measurement values for load, availability, latency, and power consumption. Rather, NFc 24 may, according to the present embodiments, be configured to select and identify other quality metrics to report. By way of example only, such other metrics include, but are not limited to, jitter, throughput, packet loss, active sessions, and session drop rate. Additionally, NFc 24 can further be configured, according to the present disclosure, to specify specific quality metrics depending on the type of nfInstance. For example, if a specified nfInstance is a database (e.g., a UDM), NFc 24 may select quality metrics such as consistency and replication levels. Similarly, if the nfInstance is a mobility management node (e.g. an AMF), then NFc 24 may select 3GPP-standardized metrics such as the KPIs defined in 3GPP TS 32.451 (e.g., accessibility, retainability, mobility, nD integrity). As those of ordinary skill in the art should appreciate, these examples are merely illustrative, and the examples provided herein are not exhaustive.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
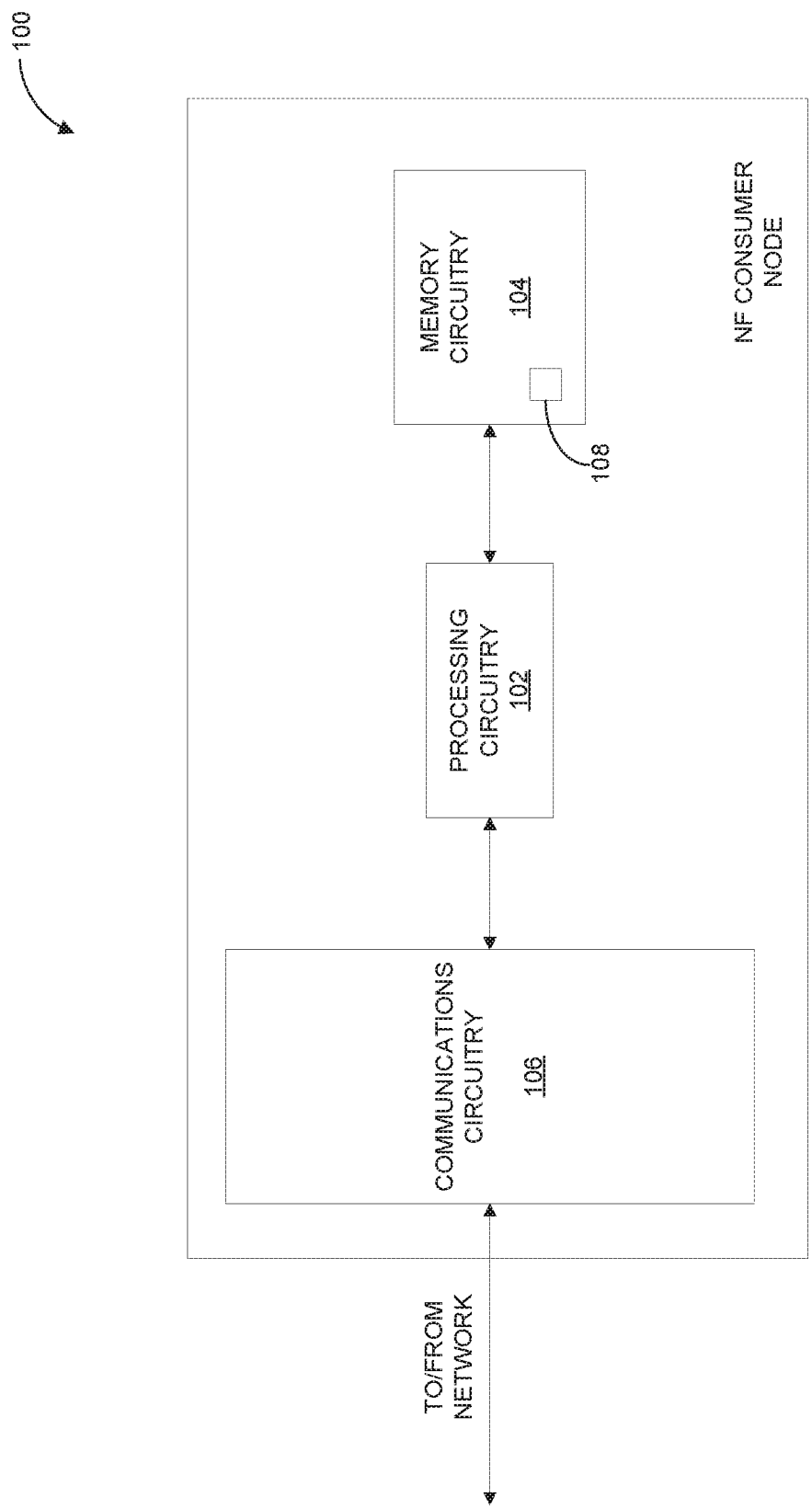
FIG. 7 is a functional block diagram illustrating some components of an NFc configured to discover NF services according to one embodiment of the present disclosure.

FIG. 7 is a functional block diagram illustrating some of the components of a network node 100 configured according to embodiments of the present disclosure. The network node 100 may, for example, be any node performing an NF as seen in FIG. 1. In one embodiment, however, network node 100 comprises a Policy and Charging Control node.

As seen in FIG. 7, network node 100 comprises processing circuitry 102, memory circuitry 104, and communications circuitry 106. In addition, memory circuitry 104 stores a computer program 108 that, when executed by processing circuitry 102, configures network node 100 to implement the method of FIG. 5 herein described.

In more detail, the processing circuitry 102 controls the overall operation of network node 100 and processes the data and information it receives from other sends and receives to/from other nodes. Such processing includes, but is not limited to, determining an NF service type to consume, generating a discovery request message to discover instances of the NF service type produced by the one or more candidate NF producers (NFps), wherein the discovery request message specifies one or more operational metrics of the NF service type to be reported to the NFc, and sending the discovery request message to a Network Repository Function (NRF) to discover the one or more candidate NFps. In this regard, the processing circuitry 102 may comprise one or more microprocessors, hardware, firmware, or a combination thereof.

The memory circuitry 104 comprises both volatile and non-volatile memory for storing computer program code and data needed by the processing circuitry 102 for operation. Memory circuitry 104 may comprise any tangible, non-transitory computer-readable storage medium for storing data including electronic, magnetic, optical, electromagnetic, or semiconductor data storage. As stated above, memory circuitry 104 stores a computer program 108 comprising executable instructions that configure the processing circuitry 102 to implement the methods herein described. A computer program 108 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 108 for configuring the processing circuitry 102 as herein described may be stored in a removable memory, such as a portable compact disc, portable digital video disc, or other removable media. The computer program 108 may also be embodied in a carrier such as an electronic signal, optical signal, radio signal, or computer readable storage medium.

The communication circuitry 106 communicatively connects network node 100 to one or more other nodes in core network 10, such as NRF 22, as is known in the art. As such, communications circuitry 68 may comprise, for example, any circuitry configured to communicate with NRF 22 and the other NF nodes in core network 10 using any well-known interface.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 8:
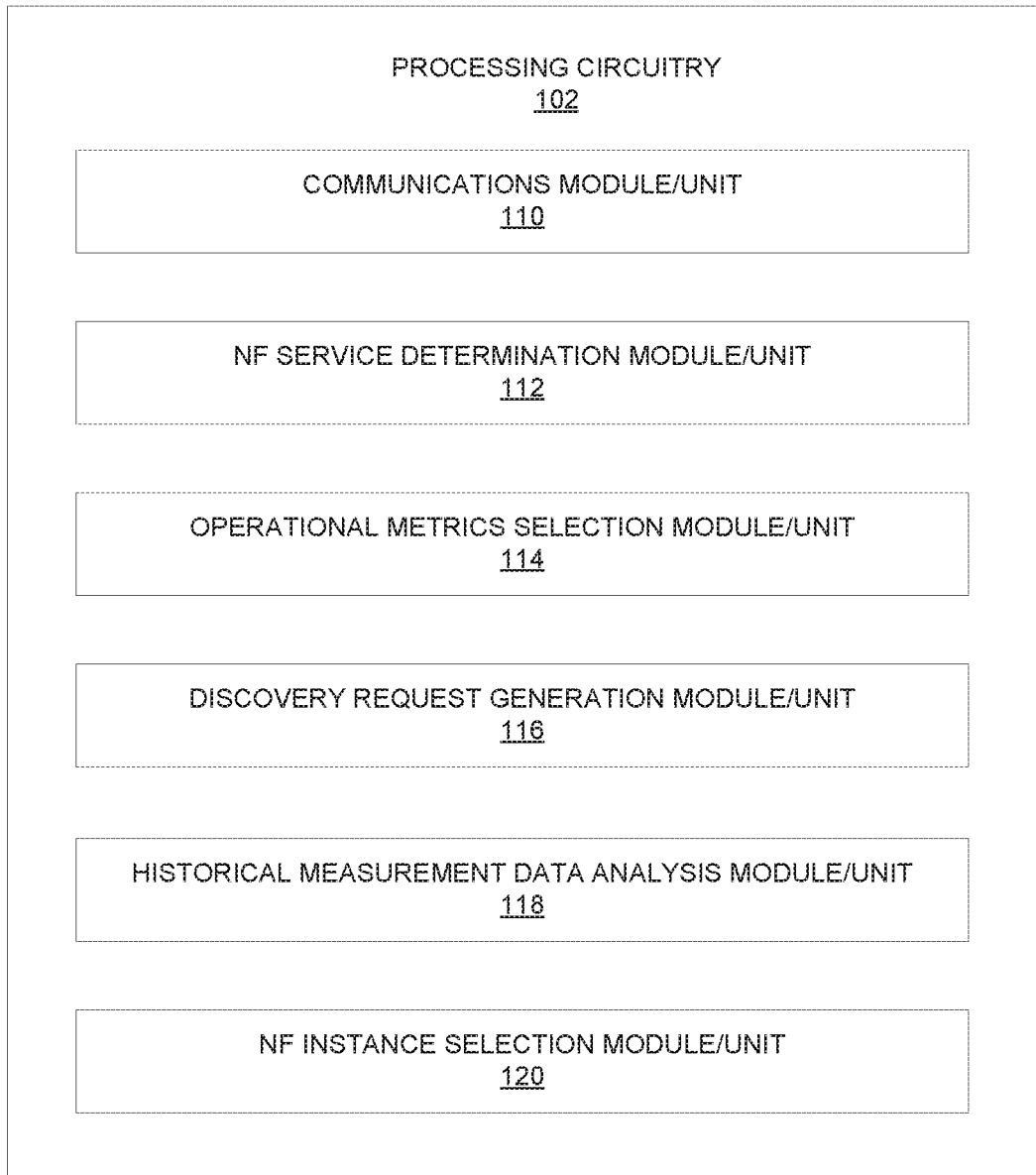
FIG. 8 is a functional block diagram illustrating some functions executed by processing circuitry of an NFc configured to discover NF services according to one embodiment of the present disclosure.

FIG. 8 is a functional block diagram illustrating some modules of a computer program 108 configured to discover NF services according to one embodiment of the present disclosure. As seen in FIG. 8, computer program 108 comprises a communications module/unit 110, an NF service determination module/unit 112, an operational metrics selection module/unit 114, a discovery request generation module/unit 116, a historical measurement data analysis module/unit 118, and an NF instance selection module/unit 120.

When computer program 108 is executed by processing circuitry 102, the communications module/unit 110 configures network node 100 to communicate with NRF 24 to send and receive the discovery request messages, and the discovery response messages, as previously described. The NF service determination module/unit 112 configures network node 100 to select a particular NF service type to consume, as previously described. The operational metrics selection module/unit 114 configures network node 100 to select the particular operational metrics that NFc 24 is interested in, as previously described. The discovery request generation module/unit 116 configures network node 100 to generate a discovery request message, as previously described. The historical measurement data analysis module/unit 118 configures network node 100 to analyze the requested historical measurement data returned by NRF 22 in a discovery response message, as previously described. The NF instance selection module/unit 120 configures network node 100 to select an instance of the requested NF service type to consume based on the measurement data returned by NRF 22, as previously described.

Embodiments further include a carrier containing such a computer program 108. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 9:
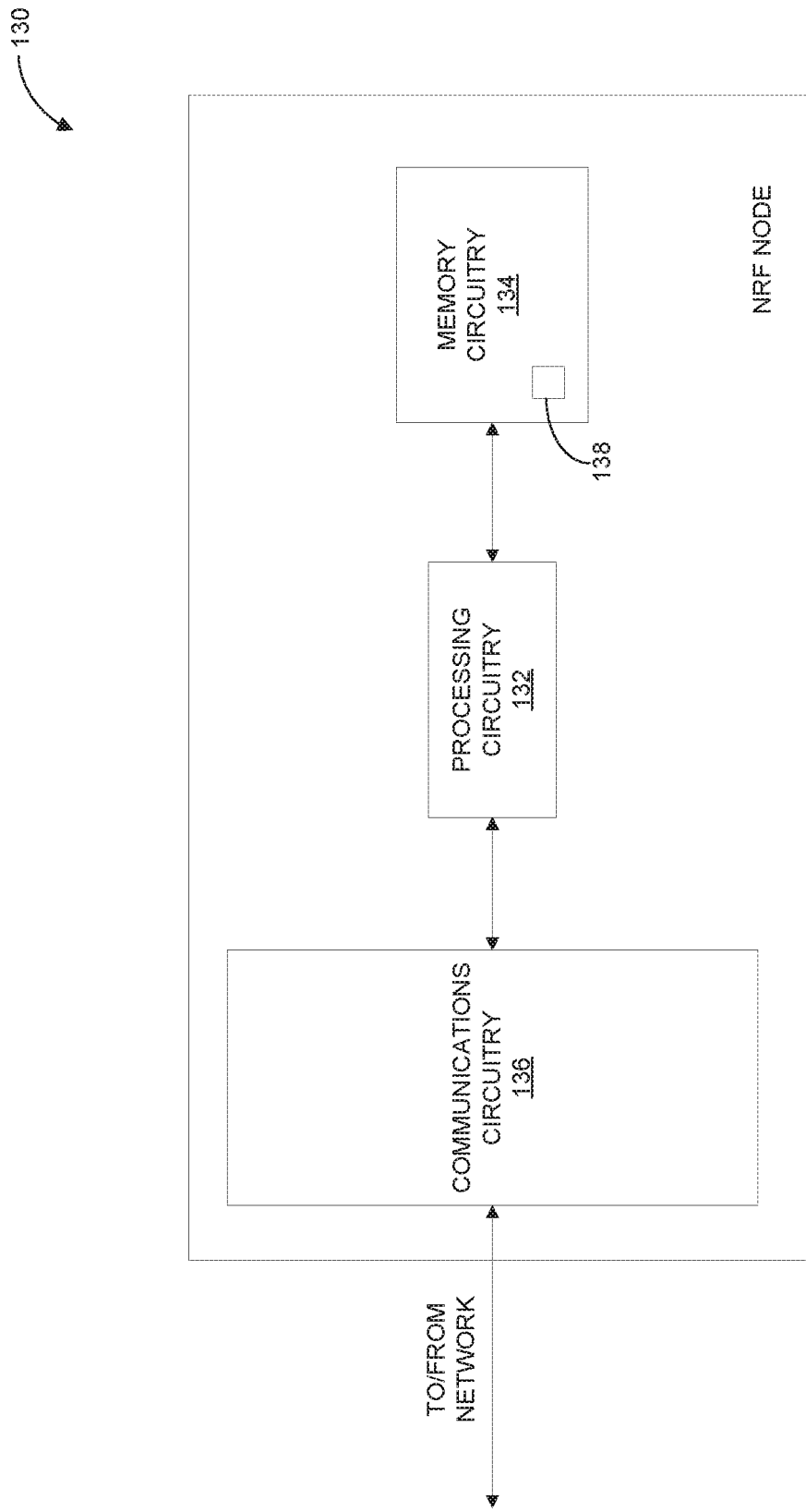
FIG. 9 is a functional block diagram illustrating some components of an NRF configured to discover NF services according to one embodiment of the present disclosure.

FIG. 9 is a functional block diagram illustrating some of the components of a network node 130 configured according to embodiments of the present disclosure. The network node 130 may, for example, be configured to perform as a NRF 22, as seen in FIG. 1.

As seen in FIG. 9, network node 130 comprises processing circuitry 132, memory circuitry 134, and communications circuitry 136. In addition, memory circuitry 134 stores a computer program 138 that, when executed by processing circuitry 132, configures network node 130 to implement the method of FIG. 6 herein described.

In more detail, the processing circuitry 132 controls the overall operation of network node 130 and processes the data and information it receives from other sends and receives to/from other nodes. Such processing includes, but is not limited to, receiving, from an NFc, a discovery request message. The discovery request message comprises information specifying one or more criteria for determining instances of an NF service type to be consumed by the NFc, and one or more operational metrics for the instances of the NF service type. Additionally, processing circuitry 132 is also configured to determine one or more instances of the NF service type based on the one or more criteria, obtain measurement data for the one or more instances based on the one or more operational metrics of the NF service type, generate a discovery response message to include a list of the one or more instances of the NF service type and the measurement data, and send the discovery response message to the NFc. In this regard, the processing circuitry 132 may comprise one or more microprocessors, hardware, firmware, or a combination thereof.

The memory circuitry 134 comprises both volatile and non-volatile memory for storing computer program code and data needed by the processing circuitry 132 for operation. Memory circuitry 134 may comprise any tangible, non-transitory computer-readable storage medium for storing data including electronic, magnetic, optical, electromagnetic, or semiconductor data storage. As stated above, memory circuitry 134 stores a computer program 138 comprising executable instructions that configure the processing circuitry 132 to implement the methods herein described. A computer program 138 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 138 for configuring the processing circuitry 132 as herein described may be stored in a removable memory, such as a portable compact disc, portable digital video disc, or other removable media. The computer program 138 may also be embodied in a carrier such as an electronic signal, optical signal, radio signal, or computer readable storage medium.

The communication circuitry 136 communicatively connects network node 130 to one or more other nodes in core network 10, such as NFc 24, as is known in the art. As such, communications circuitry 138 may comprise, for example, any circuitry configured to communicate with NFc 24 and the other NF nodes in core network 10 using any well-known interface.

Figure 10:
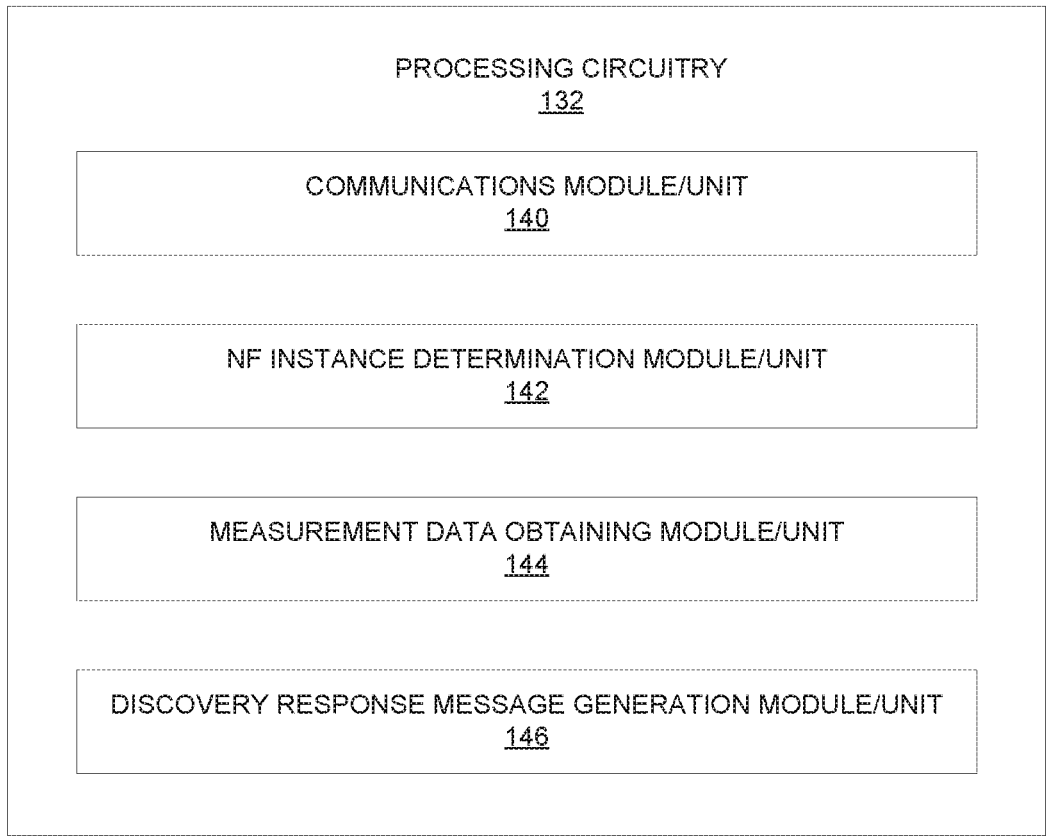
FIG. 10 is a functional block diagram illustrating some functions executed by processing circuitry of an NRF configured to discover NF services according to one embodiment of the present disclosure.

FIG. 10 is a functional block diagram illustrating some modules of a computer program 138 configured to discover NF services according to one embodiment of the present disclosure. As seen in FIG. 10, computer program 138 comprises a communications module/unit 140, an NF instance determination module/unit 142, a measurement data obtaining module/unit 144, and a discovery response message generation module/unit 146.

When computer program 138 is executed by processing circuitry 132, the communications module/unit 140 configures network node 130 to communicate with one or more NFcs 24 to receive the discovery request messages from NFc 24, and to send the discovery response messages to NFc 24, as previously described. The NF instance determination module/unit 142 configures network node 130 to determine which instances of an NF service should be identified to the NFc 24. As previously described, this determination is based on the criteria and the quality metrics specified in the discovery request message received from NFc 24. The measurement data obtaining module/unit 144 configures network node 130 to obtain the operational metrics specified by NFc 24 in the received discovery request message, as previously described. The discovery response generation module/unit 146 configures network node 130 to generate a discovery response message, as previously described.

Embodiments further include a carrier containing such a computer program 138. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for discovering Network Function (NF) services, the method implemented by an NF consumer (NFc) and comprising:
   the NFc:
      determining an NF service type to consume;
      generating a discovery request message to discover instances of the NF service type produced by one or more candidate NF producers (NFps), wherein the discovery request message specifies one or more selected operational metrics of the NF service type to be reported to the NFc, and wherein the one or more selected operational metrics specify:
         a time span during which historical measurement data for an operational metric are to be reported;
         a statistical function indicating a distribution of samples of the historical measurement data to be reported to the NFc for the time span, wherein the statistical function comprises at least one of a variance function, a standard deviation function, a mean absolute difference function, and an interquartile range function; and
         a tendency function to be applied to each sample to be reported;
      sending the discovery request message to a Network Repository Function (NRF) to discover the one or more candidate NFps; and
      receiving, from the NRF, a discovery response message comprising:
         information identifying one or more instances of the NF service type;
         current measurement data for each of the one or more operational metrics identified in the discovery request message; and
         the samples of the historical measurement data distributed according to the statistical function specified in the discovery request message.

2. The method of claim 1 further comprising the NFc selecting the one or more operational metrics based on the NF service type to consume.

3. The method of claim 1 wherein the operational metrics comprise data associated with execution of the NF service type.

4. The method of claim 1 wherein the operational metrics specify reporting current measurement data for one or more of a load, availability, latency, power consumption, jitter, throughput, packet loss, active sessions, and session drop rate, of the NF service type.

5. The method of claim 1 wherein the time span comprises an elapsed time between a time that the request is sent to the NRF and a previous time specified by the operational metrics.

6. The method of claim 1 wherein the operational metrics further specify a number of samples to be reported.

7. The method of claim 1 wherein the tendency function comprises at least one of an arithmetic mean, a median, a mode, and a geometric mean.

8. The method of claim 1 further comprising the NFC:
selecting an instance of the NF service type to consume based on the current measurement data received in the discovery response message; and
consuming the selected instance of the NF service type.

9. The method of claim 8 wherein the discovery response message further comprises the historical measurement data for the selected instance of the NF service type.

10. The method of claim 9 further comprising the NFc determining a future quality of the selected instance of the NF service type based on an analysis of the historical measurement data.

11. The method of claim 1 wherein the operational metrics comprise an array of one or more parameters sent to the NRF in the discovery request message.

12. A network node configured as a Network Function consumer (NFc), the node comprising:
communications interface circuitry configured to communicate with a Network repository Function (NRF) to discover Network Function (NF) services produced by one or more NF producers (NFps); and
processing circuitry operatively connected to the communications interface circuitry and configured to:
determine an NF service type to consume;
generate a discovery request message to discover instances of the NF service type produced by the one or more candidate NFps, wherein the discovery request message specifies one or more selected operational metrics of the NF service type to be reported to the NFc, and wherein the one or more selected operational metrics specify:
a time span during which historical measurement data for an operational metric are to be reported; and
a statistical function indicating a distribution of samples of the historical measurement data to be reported to the NFc for the time span, wherein the statistical function comprises at least one of a variance function, a standard deviation function, a mean absolute difference function, and an interquartile range function; and
a tendency function to be applied to each sample to be reported;
send the discovery request message to the NRF to discover the one or more candidate NFps; and
receiving, from the NRF, a discovery response message comprising:
information identifying one or more instances of the NF service type;
current measurement data for each of the one or more operational metrics identified in the discovery request message; and
the samples of the historical measurement data distributed according to the statistical function specified in the discovery request message.

13. A non-transitory computer-readable medium comprising a computer program stored thereon, the computer program comprising instructions that, when executed by processing circuitry in a node configured as a Network Function consumer (NFc), causes the node to:
determine a Network Function (NF) service type to consume;
generate a discovery request message to discover instances of the NF service type produced by one or more candidate NF producers (NFps), wherein the discovery request message specifies one or more selected operational metrics of the NF service type to be reported to the NFc, and wherein the one or more selected operational metrics specify:
a time span during which historical measurement data for an operational metric are to be reported;
a statistical function indicating a distribution of samples of the historical measurement data to be reported to the NFc for the time span, wherein the statistical function comprises at least one of a variance function, a standard deviation function, a mean absolute difference function, and an interquartile range function; and
a tendency function to be applied to each sample to be reported;
send the discovery request message to a Network Repository Function (NRF) to discover the one or more candidate NFps; and
receiving, from the NRF, a discovery response message comprising:
information identifying one or more instances of the NF service type;
current measurement data for each of the one or more operational metrics identified in the discovery request message; and
the samples of the historical measurement data distributed according to the statistical function specified in the discovery request message.

\* \* \* \* \*